(12) United States Patent
Markendorf

(10) Patent No.: US 9,869,757 B2
(45) Date of Patent: Jan. 16, 2018

(54) SELF-CALIBRATING LASER TRACKER AND SELF-CALIBRATION METHOD

(71) Applicant: LEICA GEOSYSTEMS AG, Heerbrugg (CH)

(72) Inventor: Albert Markendorf, Walde (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 213 days.

(21) Appl. No.: 14/653,815

(22) PCT Filed: Dec. 19, 2013

(86) PCT No.: PCT/EP2013/077452
§ 371 (c)(1),
(2) Date: Jun. 18, 2015

(87) PCT Pub. No.: WO2014/096230
PCT Pub. Date: Jun. 26, 2014

(65) Prior Publication Data
US 2015/0346330 A1    Dec. 3, 2015

(30) Foreign Application Priority Data
Dec. 20, 2012 (EP) .................................... 12198763

(51) Int. Cl.
*G01C 3/08* (2006.01)
*G01S 7/497* (2006.01)
(Continued)

(52) U.S. Cl.
CPC ............ *G01S 7/497* (2013.01); *G01S 7/4972* (2013.01); *G01S 17/06* (2013.01); *G01S 17/42* (2013.01); *G01S 17/66* (2013.01)

(58) Field of Classification Search
CPC ........ G01S 7/497; G01S 7/4972; G01S 17/06; G01S 17/42; G01S 17/66
See application file for complete search history.

(56) References Cited

U.S. PATENT DOCUMENTS

| 4,714,339 A | 12/1987 | Lau et al. |
| 4,790,651 A | 12/1988 | Brown et al. |

(Continued)

FOREIGN PATENT DOCUMENTS

| EP | 1 420 264 A1 | 5/2004 |
| EP | 1 770 360 A1 | 4/2007 |

(Continued)

OTHER PUBLICATIONS

European Search Report dated Mar. 5, 2013 as received in Application No. 12198763.0.

*Primary Examiner* — Samantha K Abraham
(74) *Attorney, Agent, or Firm* — Maschoff Brennan

(57) ABSTRACT

Some embodiments of the invention relate to a laser tracker for determining the position of a target and in particularly for the continuous tracking of the target. In some embodiments, the laser tracker includes a beam source for generating measurement radiation, an angle measuring function for determining a horizontal pivot angle and a vertical pivot angle, a distance measuring function and a position sensitive surface detector for determining a point of impact of the reflected measurement radiation on the surface detector and for generating an output signal in order to control a target tracking function. The laser tracker may include a self-calibrating function for calibrating a beam offset using a reflecting calibration device.

24 Claims, 7 Drawing Sheets

(51) Int. Cl.
*G01S 17/42* (2006.01)
*G01S 17/06* (2006.01)
*G01S 17/66* (2006.01)

(56) References Cited

U.S. PATENT DOCUMENTS

| | | |
|---|---|---|
| 7,180,607 B2 | 2/2007 | Kyle et al. |
| 8,031,331 B2 | 10/2011 | Meier et al. |
| 8,827,469 B2 | 9/2014 | Wiebking et al. |
| 2004/0136012 A1* | 7/2004 | Kyle .................. G01S 5/163 356/614 |
| 2009/0109426 A1 | 4/2009 | Cramer et al. |

FOREIGN PATENT DOCUMENTS

| | | |
|---|---|---|
| WO | 2005/026772 A2 | 3/2005 |
| WO | 2007/079600 A1 | 7/2007 |

* cited by examiner

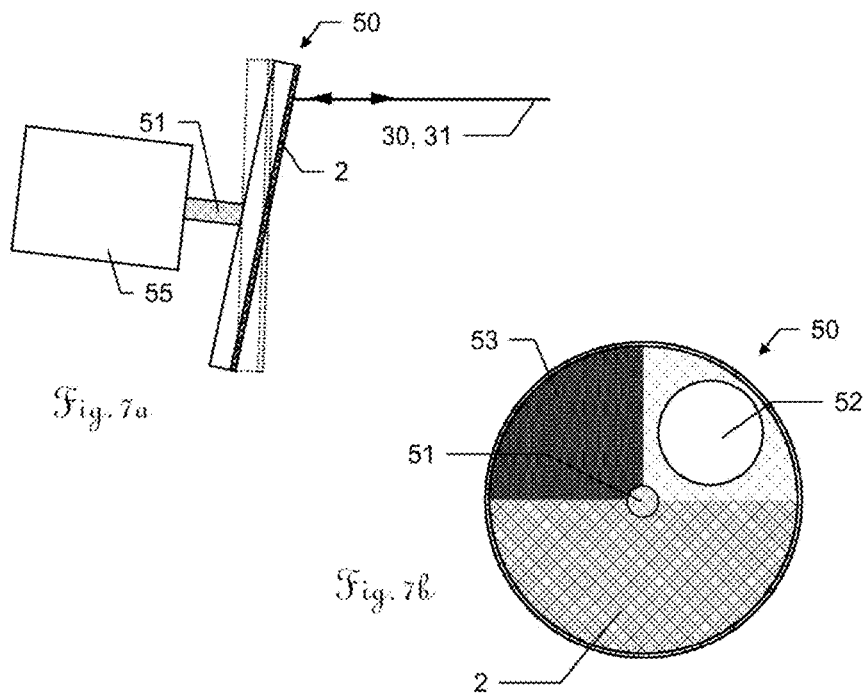
Fig. 7a
Fig. 7b
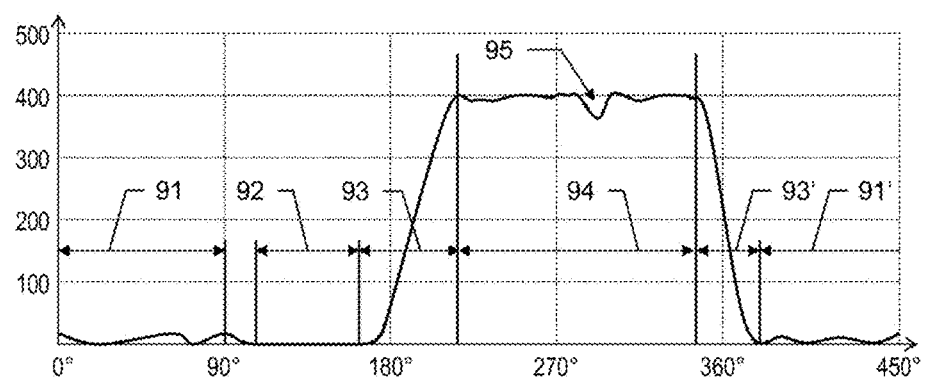
Fig. 8

SELF-CALIBRATING LASER TRACKER AND SELF-CALIBRATION METHOD

FIELD OF THE INVENTION

Some embodiments of the invention relate to a self-calibrating laser tracker for determining coordinates of spatial points. The laser tracker comprises a stationary part having a base, a part that is rotatable about a vertical axis relative to the base, and a beam directing unit, which is rotatable together with the rotatable part, and also a laser light source for providing a laser beam to be emitted by the beam directing unit with a target axis and a direction of incidence on a reflector or target point to be targeted.

BACKGROUND

Some embodiments of the invention relate to an associated self-calibration method for a laser tracker.

In this case, a laser tracker of the type mentioned in the introduction comprises a base defining a vertical axis, a support and a beam directing unit for emission of measurement radiation and for reception of at least part of the measurement radiation reflected at a target. The beam directing unit is oriented in two axes (vertical axis and inclination axis or tilting axis), by means of motors. In this case, the support is pivotable in a motorized fashion about the vertical axis relative to the base, and the beam directing unit about a tilting axis relative to the support. A measuring axis is defined by an emission direction of the measurement radiation.

The beam directing unit is equipped with opto-electro-mechanical components and is mounted at one or two mounting locations on the support rotatably about the tilting axis by means of a shaft, said support likewise being equipped with opto-electro-mechanical components, if appropriate.

Laser trackers as coordinate measuring machines belong to a type of measuring machines which measure the coordinates of a (spatial) point by emitting a laser beam onto the point. The laser beam may impinge directly on the point or on a retroreflector (often a cube corner prism or "corner cube" or arrangement having three mirrors oriented perpendicularly to one another) which is in contact with the point. In the case of a retroreflector, the laser beam impinging thereon is reflected "on itself", i.e. coaxially with respect to the emitted laser beam, if the latter impinges exactly on the center of the retroreflector. Otherwise, if the emitted laser beam impinges on the retroreflector outside the center thereof, the reflected laser beam has a parallel offset with respect to the emitted laser beam.

The machine typically determines the coordinates of the point by measuring the distance between the point and the measuring machine and two angles by means of angle encoders or angle sensors assigned to rotation axes of the laser tracker between a standard orientation of the laser beam with regard to its targeting direction with respect to the point to be measured. The distance is measured by a distance measuring device, such as, for example, an absolute distance measuring device and/or an interferometer. Exemplary systems for determining coordinates of a point are disclosed in U.S. Pat. No. 4,790,651 and U.S. Pat. No. 4,714,339.

Laser trackers are a special type of coordinate measuring machines used to track an, in particular moving, target point, in particular embodied as a retroreflector, by means of one or a plurality of, in particular focused, laser beams.

Reliable use of laser trackers that is reproducible in the measurement result necessitates the setting and application of calibration parameters. Calibration parameters are typically stored as numerical values in the form of software or firmware in a manner accessible to the laser tracker controller and, when applied to the raw measurement data of the laser tracker, serve to improve the measurement accuracy. Typically, the manufacturer of the laser tracker carries out so-called calibration measuring methods for determining the calibration parameters and stores the corresponding calibration parameters with the control software. On the machine side, certain tolerances regarding the extent to which current calibration parameters are allowed to deviate from previously stored calibration parameters are usually additionally defined with the control. In order to determine changes in the machine calibration, monitoring calibration measurements are typically carried out at specific intervals and/or when the laser tracker is switched on.

Changes in the required machine calibration are based in particular on thermal drift effects, but also on mechanical vibrations, for example.

EP 1 420 264 discloses a laser tracker and a measuring method implementable therewith with calibration devices and specifications. A measuring system is described which comprises a measuring machine having a laser tracker and an optoelectronic sensor in invariable positions relative to one another, a system computer and a separate auxiliary measuring instrument, i.e. which is to be arranged at a distance from the laser tracker, with a reflector and at least three light points. The laser tracker is calibrated by means of the method steps described below: the auxiliary measuring instrument is rigidly connected to an arrangement of auxiliary reflectors and moved about at least two rotation axes that differ from one another relative to the auxiliary measuring instrument. In at least two respective rotation positions about each of the at least two rotation axes, reflector and auxiliary reflectors are targeted by the laser tracker and the light points of impinging laser light are registered by the optoelectronic sensor. Positions and orientations of the reflector arrangement relative to the laser tracker are determined from the measurement data of the laser tracker and positions and orientations of the light point arrangement relative to the optoelectronic sensor are determined from the measurement data of the optoelectronic sensor and the at least two rotation axes relative to the reflector arrangement and to the light point arrangement are calculated therefrom. The calibration data are then calculated from the measurement data ascertained.

This system arrangement and the calibration method associated therewith do not correspond to the arrangement nor to the typically imposed specifications of a laser tracker according to the present invention and, in particular, nor do they correspond to present-day requirements made of such a measuring system.

Particularly disadvantageously, the auxiliary measuring instrument for the calibration is arranged outside the measuring machine or laser tracker, which does not satisfy requirements made of present-day laser trackers for the fullest possible compactly arranged integration or combination with the measuring machine, and a self-calibration method comprising automatically proceeding, machine-controlled method steps without the involvement of an operator cannot be gathered from EP 1 420 264.

US 2009/0109426 and WO 2005/026772 disclose a self-calibrating laser tracker comprising a laser for emitting a laser beam, a plane mirror and at least two integrated immobile, reflective devices and also a rotatable mirror and a position-sensitive detector. One of the at least two immobile, reflective devices is embodied as a corner cube retroreflector, and a second as a plane mirror. The corner cube retroreflector and the plane mirror can be fixed in position on a stationary part of the measuring system and are designed to reflect the laser beam according to a two-position measuring method, i.e. in a "front-side mode" and a "rear-side mode". In this case, the "front-side mode" corresponds to the orientation of the laser tracker in accordance with a regular target tracking, and the "rear-side mode" corresponds to an opposite orientation of the laser tracker.

In accordance with the arrangements disclosed in US 2009/0109426 and WO 2005/026772, measurement values of temperature sensors arranged on the machine are used to ascertain a temperature dependence of the values to be determined for the calibration parameters.

The arrangements disclosed in US 2009/0109426 and WO 2005/026772 are disadvantageous, however, owing to the need to use a complexly producible individual retroreflector such as a cube corner retroreflector having precisely defined or produced reflective surfaces and very stringent requirements made of its exact positioning for the purposes of reliable self-calibration of the alignment of a laser tracker.

SUMMARY

Some embodiments of the invention provide a coordinate measuring machine, in particular a laser tracker, which is improved compared with the prior art and has fewer complex optical components for performing a self-calibration of the alignment of the laser tracker, in conjunction with a simplified implementation of the self-calibration. In this case, the laser tracker is intended to be designed to enable such a self-calibration of its alignment automatically, in particular after start-up of the machine, without required activities or interventions on the part of a user. Moreover, all components required for such a self-calibration are intended to be integrated in the coordinate measuring machine or the laser tracker or arranged fixedly thereon.

Some embodiments include means of the realization of the characterizing features of the independent claims. Features that develop the invention in an alternative or advantageous manner can be gathered from the dependent patent claims.

Some embodiments include by means of a self-calibrating coordinate measuring device, in particular a self-calibrating laser tracker, for determining coordinates of spatial points. Hereinafter, all indications with regard to a laser tracker also relate to a corresponding coordinate measuring device. The laser tracker comprises a stationary part having a base, a part that is rotatable about a vertical axis relative to the base, and a beam directing unit, which is rotatable together with the rotatable part, and also a laser light source for providing a laser beam to be emitted by the beam directing unit with a target axis and a direction of incidence on a reflector or target point to be targeted. An inclination sensor for determining an inclination in a horizontal direction and a vertical direction perpendicular to the horizontal direction is preferably arranged on the base. Furthermore, the laser tracker has a tilting axis and a vertical axis.

The laser tracker additionally comprises a position-sensitive surface detector, which can be embodied in particular as a position-sensitive detector (PSD), but likewise also as an image sensor such as CCD or CMOS.

If the laser tracker comprises a beam directing unit with optical components, a beam splitter for deflecting a laser beam returning from the target point or the reflector onto the PSD integrated in the beam directing unit with a detector sensor is preferably integrated in the beam directing unit. By contrast, if the laser tracker comprises a movable mirror as beam directing unit, and if the other optical components are integrated in the support or in the base, beam splitter and PSD are also preferably integrated in the support or in the base.

The laser tracker according to the invention is characterized by a calibration device embodied as a retroreflector. According to the invention, the retroreflector, in a two-dimensional region, is designed for generating a substantially offset-free, coaxial retroreflection of measurement radiation impinging on it, i.e. without in this case generating a significant offset of the reflected measurement radiation with respect to the direction of the impinging measurement radiation.

According to the invention, the two-dimensional region of the retroreflector is larger than the beam diameter of the impinging measurement radiation. Advantageously, the two-dimensional region in this case is at least large enough that, in the event of straying—occurring at least within expectable bounds—of the measurement radiation (in particular a parallel beam offset and/or a direction deviation), said two-dimensional region can still be impinged on by the measurement radiation even if the midpoint of the two-dimensional region is targeted. Accordingly, the minimum size also depends on the position of the retroreflector.

The retroreflector serves for determining an impingement point as servocontrol point of the reflected laser beam on the PSD and an offset between the servocontrol point on the PSD with respect to the detector center thereof and also a distance between target axis and vertical axis and a distance between target axis and tilting axis.

In particular, the retroreflector has a multiplicity of individual reflectors. The retroreflector is generally preferably embodied as a retroreflective film or a rigid retroreflector made of plastic and in particular composed of individual prisms or individual reflective spheres. The production of such retroreflectors, particularly if products sold in large quantities are involved here, is advantageously associated with relatively low complexity and therefore also correspondingly low product costs.

The invention thus provides a laser tracker having, in comparison with the prior art, much less complexly embodied components which enable an automatically proceeding self-calibration of the alignment of the laser tracker without required activities or interventions on the part of a user. In this case, in particular, a beam offset between incident laser beam and reflected laser beam as a result of the incident laser beam impinging non-centrally on a retroreflector is advantageously substantially avoided.

The retroreflector can either be integrated into the stationary part or the rotatable part or fixedly connected to that stationary part or the rotatable part, or be arranged within the beam directing unit, advantageously arranged in a manner movable into the beam path of the measurement radiation.

Preferably, the retroreflector is arranged in a manner inclined relative to a plane orthogonal to the direction of incidence. As a result, disadvantageous effects resulting from reflection of the incident light at a front surface, instead of at the optical surfaces provided for reflections, of the retroreflector are reduced or even avoided.

Moreover, it is preferred for the retroreflector to be arranged in combination with a device for light shading, in a beam path to the PSD. Preferably, in this case, the arrangement for light shading is embodied pivotably or rotatably in the beam path, such that intensities of reflections onto the PSD and intensities upon the shading of the beam path can be measured and recorded sequentially, without an alteration of the beam path.

Furthermore, for one specific embodiment of the invention it is preferred for the retroreflector to be arranged and embodied pivotably or rotatably relative to a laser beam incident on it, in particular as a part of a plate that is pivotable or rotatable about a rotation spindle. In this case, it is possible to arrange the plate with the retroreflector either outside or inside, wherein required alignments of the plate with the retroreflector in the beam path are obviated in the case of a preferred arrangement inside the beam directing unit.

Upon a rotation of a retroreflector having many individual reflectors with the plate during the reflection of the incident light to the PSD, it is advantageously possible to reduce or even eliminate disadvantageous effects resulting from incorrect reflections or even failure of reflections at imperfectly embodied surfaces of the retroreflector. This is made possible by averaging the measurement data of sequential reflections at individual reflectors of the retroreflector that are moved in the beam path.

In this case, preferably, the retroreflector is fitted non-perpendicularly to the rotation spindle of the plate, such that a wobble error is implementable upon a rotation of the retroreflector about said rotation spindle. As a result of a wobble movement of the retroreflector that takes place upon rotation of the spindle with retroreflector and plate, this has the effect of then changing sequentially the targeting angles and thus the distances with respect to the individual reflectors of the retroreflector and also with respect to the retroreflector in its entirety and/or the associated path lengths of the light incident on the retroreflector, permanently. In this case, the path length changes preferably amount to a plurality of wavelengths of the incident light. As a result, during sequential measurements, corresponding sequential shifts of a possibly generated interference pattern of the light directed onto the PSD are brought about, such that effects of the interferences can be eliminated by the averaging of the measurement results.

With regard to the abovementioned specific embodiment of the invention with the retroreflector as a part of a plate that is pivotable or rotatable about a rotation spindle embodied retroreflector, it is furthermore preferred for the rotatable plate to be embodied with a first surface portion formed by the retroreflector, a second surface portion, which is substantially light-nontransmissive, and a third surface portion, which is optically transparent to the laser beam.

In this case, according to the invention the plate is embodied with a design or surface that is segmented for varying light passage. The plate is arranged in a manner pivotable and/or rotatable about a spindle. A for example semicirculate region of the plate is equipped with a retroreflector, in particular a retroreflective film, consisting of many individual reflectors. A further region of the plate is provided for a dark calibration, i.e. for measurements for determining a baseline of detector signals, without light reflected back onto the PSD. In this case, this region can have for example a light absorbing and in particular also in reflection diffusely scattering dark surface, in particular composed of felt or velvet. A further region of the plate is embodied as transparent to impinging light, i.e. for regular measurements with the laser tracker.

This further development of the invention is associated with various advantages. In particular, the emitted laser beam does not have to be oriented differently for the purpose of measurements for determining the servocontrol point and the distance thereof with respect to the center of the PSD for the self-calibration of the alignment and targeting of an object, in particular to be tracked, arranged outside the laser tracker.

In this case, there are various embodiment possibilities for determining the servocontrol point: in accordance with a first embodiment possibility, the plate in the region of the retroreflector oscillates back and forth between two positions perpendicularly to the emission direction of the laser beam, wherein sequential measurements are carried out continuously, such that disadvantageous effects of partly imperfectly embodied surfaces of the retroreflector are eliminatable by averaging the sequential measurement results. In accordance with another embodiment possibility, associated with similar advantages of measurements on different impingement points of the retroreflector, the plate with its regions embodied differently for light passage rotates continuously in one direction, wherein the intensity of light reflected back onto the PSD is continuously measured and measured as a function of the rotational position of the plate, recorded as a measurement record and evaluated.

In one embodiment, the retroreflector is arranged movably in the beam directing unit in such a way that, as a result of the orientation of the beam directing unit relative to the direction of the gravitational force, the retroreflector is movable into the beam path of the measurement radiation by the gravitational force, that is to say in an unmotorized manner, and is movable back into the starting position again by the gravitational force in the event of a change in the orientation.

In accordance with another preferred embodiment of the invention, the retroreflector, in particular consisting of many individual reflectors, is arranged outside the beam directing unit and connected to the stationary part of the laser tracker, and is preferably not embodied as a part of a rotatable plate, rather the beam directing unit, in particular in a motor-driven manner, with a movement center, is arranged in a manner pivotable or rotatable about a tilting axis and a vertical axis into a telescope rotation point, such that a corresponding movement of the beam directing unit can generate temporally sequentially a two-dimensional course of the impingement point of the laser beam on a surface of the retroreflector, in particular with a two-dimensionally circle-like or loop-like geometrical contour.

Advantageously, such guidance of the incident laser beam onto a reflector consisting of many individual reflectors also makes it possible to reduce or even eliminate disadvantageous effects resulting from incorrect reflections or even failure of reflections at imperfectly embodied surfaces of the retroreflector. This is made possible by averaging the measurement data of sequential reflections at individual reflectors of the retroreflector that are moved in the beam path.

The limited precision of the individual reflectors can have the consequence that the reflected light is reflected back with a pronounced light granulation, in the manner of an interference pattern, which can lead to a significant shift of the intensity centroid of the light reflected back, in comparison with a perfectly reflected light beam. Advantageously, therefore, a retroreflector consisting of many individual reflectors is arranged in a plane situated non-orthogonally with respect to the direction of the measurement radiation, such that the measurement radiation impinges on the retroreflector obliquely, i.e. not at a right angle. Upon traversing a path on the oblique retroreflector with the measurement radiation, this automatically results in a distance variation, wherein the path length change preferably amounts to a plurality of wavelengths of the incident light. Corresponding sequential shifts of a possibly generated interference pattern of the light directed onto the PSD are brought about and recorded. Effects of possible interferences of the laser light impinging on the PSD are then eliminated by an averaging of the measurement results.

In accordance with a further preferred embodiment of the invention, the retroreflector, in particular consisting of many individual reflectors, is likewise arranged outside the beam directing unit and in this case is directly or indirectly connected to that part of the laser tracker which is rotatable about a vertical axis. In this case, it is furthermore preferred for the beam directing unit to be arranged in a manner pivotable about a tilting axis and a vertical axis about a telescope rotation point and for pivoting of the beam directing unit to make it possible to generate temporally sequentially a one-directional course of the impingement point of the laser beam on a surface of the retroreflector. The path of the impinging laser beam that is generated on this retroreflector can have the geometrical shape of a straight line or of a narrow strip. This is associated with advantages similar to the above-described variant with generation of a two-dimensional path on the surface of the retroreflector: such guidance of the incident laser beam onto the reflector consisting of many individual reflectors advantageously makes it possible to reduce or even eliminate disadvantageous effects resulting from incorrect reflections or even failure of reflections at imperfectly embodied surfaces of the retroreflector. This is made possible by averaging the measurement data of sequential reflections at individual reflectors of the retroreflector that are moved in the beam path.

Further subject matter of the invention is a self-calibration method for a laser tracker according to the invention. The laser tracker comprises a stationary part having a base, a part that is rotatable about a vertical axis relative to the base, and a beam directing unit, which is rotatable together with the rotatable part, and also a laser light source for providing a laser beam to be emitted by the beam directing unit with a target axis and a direction of incidence on a reflector or target point to be targeted. An inclination sensor for determining an inclination in a horizontal direction and a vertical direction perpendicular to the horizontal direction is preferably arranged on the base. Furthermore, the laser tracker has a tilting axis and a vertical axis. A beam splitter for deflecting a laser beam returning from the target point or the reflector onto a PSD integrated in the beam directing unit with a detector center is integrated in the beam directing unit.

As a substep of the method, optionally, the inclination sensor is used to determine an inclination of the base in a horizontal direction and a vertical direction perpendicular to the horizontal direction. According to the invention, the method comprises as further steps:

emitting a laser beam from the beam directing unit onto the retroreflector, which, in a two-dimensional region, is designed for generating a substantially offset-free, coaxial retroreflection of measurement radiation impinging on it, without in this case generating a significant offset of the reflected measurement radiation with respect to the direction of the impinging measurement radiation, in particular wherein the retroreflector has a multiplicity of individual reflectors in the two-dimensional region;

determining an impingement point of the reflected laser beam on the PSD as a servocontrol point and an offset between the servocontrol point on the PSD with respect to the detector center thereof and also distances between target axis and vertical axis and between target axis and tilting axis; and determining a target axis direction error by means of a measuring device fixedly connected to the stationary part, in particular the base.

In this case, the retroreflector can either be integrated into the stationary part or the rotatable part or fixedly connected to the stationary part or the rotatable part or else be provided within the beam directing unit.

Preferably, in the case of a corresponding embodiment of the laser tracker according to the invention, the retroreflector is moved, in particular pivoted or rotated, relative to the direction of incidence of the laser beam impinging on it, for the purpose of carrying out sequential measurements. The measurement data of sequential reflections at individual reflectors of the retroreflector that are moved in the beam path are averaged. This advantageously makes it possible to reduce or even eliminate disadvantageous effects resulting from incorrect reflections or even failure of reflections at imperfectly embodied surfaces of the retroreflector.

It is preferred for the the retroreflector to be arranged in combination with a device for light shading, in a beam path to the PSD. Preferably, in this case, the arrangement for light shading is pivoted or rotated in the beam path. As a result, intensities of reflections onto the PSD and intensities upon shading of the beam path can be measured and recorded advantageously sequentially, without an alteration of the beam path.

Furthermore, for one specific embodiment of the method according to the invention, it is preferred for the retroreflector to be arranged and embodied pivotably or rotatably as a part of a plate that is pivotable or rotatable about a rotation spindle, wherein the plate with the retroreflector is arranged outside or inside, but preferably inside the beam directing unit. According to the invention, the plate with the retroreflector is then pivoted or rotated in the beam path of the emitted laser beam for the purpose of carrying out sequential measurements. In the case of an advantageous arrangement inside the beam directing unit, alignment of the plate with the retroreflector in the beam path that otherwise are possibly additionally required are obviated.

It is furthermore preferred for the retroreflector to be arranged non-perpendicularly to the rotation spindle of the plate, such that a wobble movement of the retroreflector is implemented upon a rotation of said retroreflector about the rotation spindle. As a result of a wobble movement of the retroreflector that takes place upon rotation of the spindle with retroreflector and plate, this has the effect of then changing sequentially the targeting angles and thus the distances with respect to the individual reflectors of the retroreflector and also with respect to the retroreflector in its entirety and/or the associated path lengths of the light incident on the retroreflector, permanently. In this case, the path length changes preferably amount to a plurality of wavelengths of the incident light. Advantageously, in the case of the wobble movements of the retroreflector during the rotation, measurements are carried out sequentially and corresponding sequential shifts of a possibly generated interference pattern of the light directed onto the PSD are brought about and recorded. Effects of possible interferences of the laser light impinging on the PSD are then eliminated by an averaging of the measurement results.

With regard to the abovementioned specific embodiment of the method according to the invention with the retroreflector embodied as a part of a plate that is pivotable or rotatable about a rotation spindle, it is furthermore preferred for the rotatable plate to be embodied with a first surface portion formed by the retroreflector, a second surface portion, which is substantially light-nontransmissive, and a third surface portion, which is optically transparent to the laser beam, wherein the plate is embodied with a design or surface that is segmented for varying light passage. The plate is pivoted and/or rotated about a spindle. A for example semicirculate region of the plate is equipped with a retroreflector, in particular a retroreflective film, consisting of many individual reflectors, and, upon movement of the light emitted by the beam directing unit, laser light is reflected back to the PSD by the retroreflector and recorded. A further region of the plate is provided for a dark calibration, i.e. for measurements for determining a baseline of detector signals, without light reflected back onto the PSD. In this case, this region can have for example a light absorbing and in particular also in reflection diffusely scattering dark surface, in particular composed of felt or velvet. When this region is passed through by the incident laser beam, a background light signal is measured and recorded by the PSD. A further region of the plate is embodied as transparent to impinging light, i.e. for regular measurements with the laser tracker.

This further development of the invention is associated with various advantages. In particular, the emitted laser beam does not have to be oriented differently for the purpose of measurements for determining the servocontrol point and the distance thereof with respect to the center of the PSD for the self-calibration of the alignment and targeting of an object, in particular to be tracked, arranged outside the laser tracker.

In this case, there are various embodiment possibilities for determining the servocontrol point: in accordance with a first embodiment possibility, the plate in the region of the retroreflector oscillates back and forth between two positions perpendicularly to the emission direction of the laser beam, wherein sequential measurements are carried out continuously, such that disadvantageous effects of imperfectly embodied surfaces of the retroreflector are eliminatable by averaging the sequential measurement results. In accordance with another embodiment possibility, associated with similar advantages of measurements on different impingement points of the retroreflector, the plate with its regions embodied differently for light passage rotates continuously in one direction, wherein the intensity of light reflected back onto the PSD is continuously measured and measured as a function of the rotational position of the plate, recorded as a measurement record and evaluated.

In accordance with another preferred embodiment of the invention, the retroreflector, in particular consisting of many individual reflectors, is arranged outside the beam directing unit and connected to the stationary part of the laser tracker, and is preferably not embodied as a part of a rotatable plate, rather the beam directing unit, in particular in a motor-driven manner, with a movement center, is arranged in a manner pivotable or rotatable about a tilting axis and a vertical axis into a telescope rotation point. In accordance with this embodiment of the method according to the invention, a corresponding movement of the beam directing unit generates temporally sequentially a two-dimensional course of the impingement point of the laser beam on a surface of the retroreflector, in particular with a two-dimensionally circle-like or loop-like geometrical contour. Measurement data of sequential reflections at individual reflectors of the retroreflector that are moved in the beam path are averaged.

Advantageously, such guidance of the incident laser beam onto the reflector consisting of many individual reflectors also makes it possible to reduce or even eliminate disadvantageous effects resulting from incorrect reflections or even failure of reflections at imperfectly embodied surfaces of the retroreflector.

In accordance with a further preferred embodiment of the invention, the retroreflector, in particular consisting of many individual reflectors, is likewise arranged outside the beam directing unit and in this case is directly or indirectly connected to that part of the laser tracker which is rotatable about a vertical axis. In this case, it is furthermore preferred for the beam directing unit to be arranged in a manner pivotable and/or rotatable about a tilting axis and a vertical axis about a telescope rotation point and by pivoting or rotating of the beam directing unit to generate temporally sequentially a one-directional course of the impingement point of the laser beam on a surface of the retroreflector. The path of the impinging laser beam that is generated on this retroreflector can have the geometrical shape of a straight line or of a narrow strip. This is associated with advantages similar to the above-described variant with generation of a two-dimensional path on the surface of the retroreflector: such guidance of the incident laser beam onto the reflector consisting of many individual reflectors advantageously makes it possible to reduce or even eliminate disadvantageous effects resulting from incorrect reflections or even failure of reflections at imperfectly embodied surfaces of the retroreflector. Averaging the measurement data of sequential reflections at individual reflectors of the retroreflector that are moved in the beam path is carried out for this purpose.

BRIEF DESCRIPTION OF THE DRAWINGS

The laser tracker according to the invention and the self-calibration method according to the invention are described in greater detail purely by way of example below on the basis of concrete exemplary embodiments illustrated schematically in the drawings, further advantages of the invention also being discussed. In the figures specifically:

FIG. 7a shows a first further development of the invention with a back-reflector which consists of many individual reflectors and is mounted on a plate and together therewith on a rotation spindle that is rotatably drivable by a motor;

FIG. 7b shows an additional further development with respect to the embodiment of the invention in accordance with FIG. 7a;

FIG. 8 shows an exemplary profile of a measurements carried out with the embodiment of the invention in accordance with FIG. 7b and of intensities—determined by a PSD—of light impinging on this detector, as a function of the rotational position of the plate;

DETAILED DESCRIPTION

Figure 1:
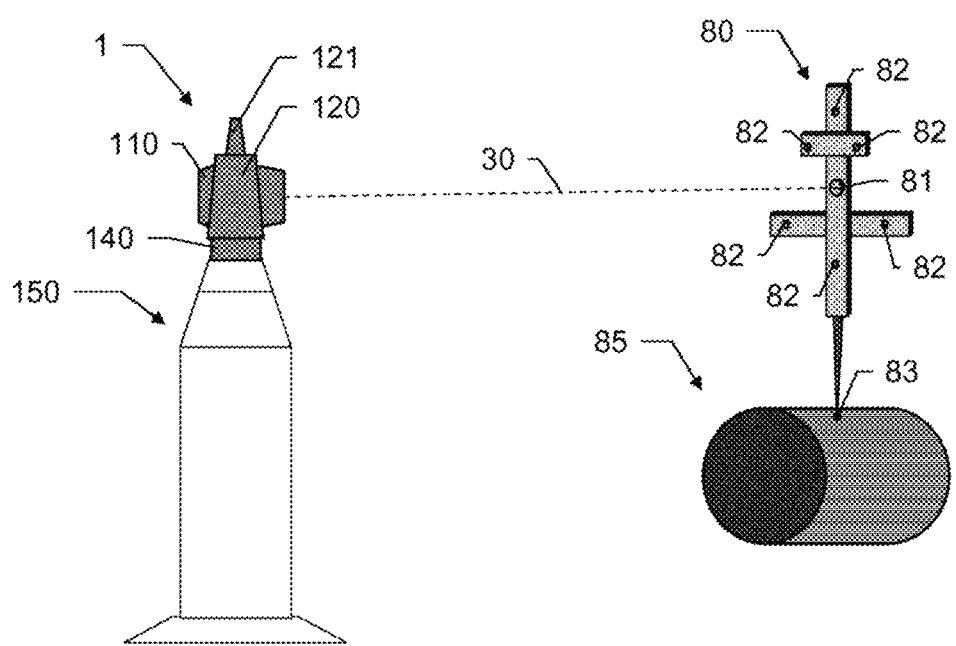
FIG. 1 shows a laser tracker according to the invention with a measuring aid.

FIG. 1 shows one exemplary embodiment of a laser tracker 1 according to the invention, comprising a base 140, a support 120 fitted thereon and having a handle 121, and a beam directing unit 110 mounted on two struts (not illustrated) of the support 120. The laser tracker 1 depicted is arranged on a stand 150 and, by means of a laser beam 30, measures the distance to a retroreflector 81 situated on a measuring aid 80. The measuring aid 80—embodied here by way of example as a measuring probe—furthermore comprises a number of target markings 82, for example in the form of reflective or self-luminous light points, and also a measuring head 83 for positioning on a target point to be measured of a target object 85.

The laser tracker 1 illustrated comprises a measuring camera, which is configured in particular as a focusable zoom camera system having variable magnification in order to capture the target markings arranged on the measuring aid 80. The spatial orientation of the measuring aid 80 is determinable on the basis of the positions of the target markings 82 that are recorded by the measuring camera.

In order to identify and to be able to reproduce movements of the measuring aid 80, such that the laser beam 36 remains aligned with the retroreflector 81, the laser tracker 1 comprises a position-sensitive detector (PSD), in particular a tracking surface sensor, such as is disclosed for example in WO 2007/079600 A1.

The PSD is preferably arranged in the beam directing unit 110 and makes it possible to track the alignment of the laser beam 30 by detecting the alignment of the laser beam 30 reflected from a target, in particular the retroreflector 81. The tracking of the laser beam alignment makes it possible for continuous target tracking of the target point to be carried out and for the distance and position of the target point to be determined continuously relative to the measuring machine.

Figure 2:
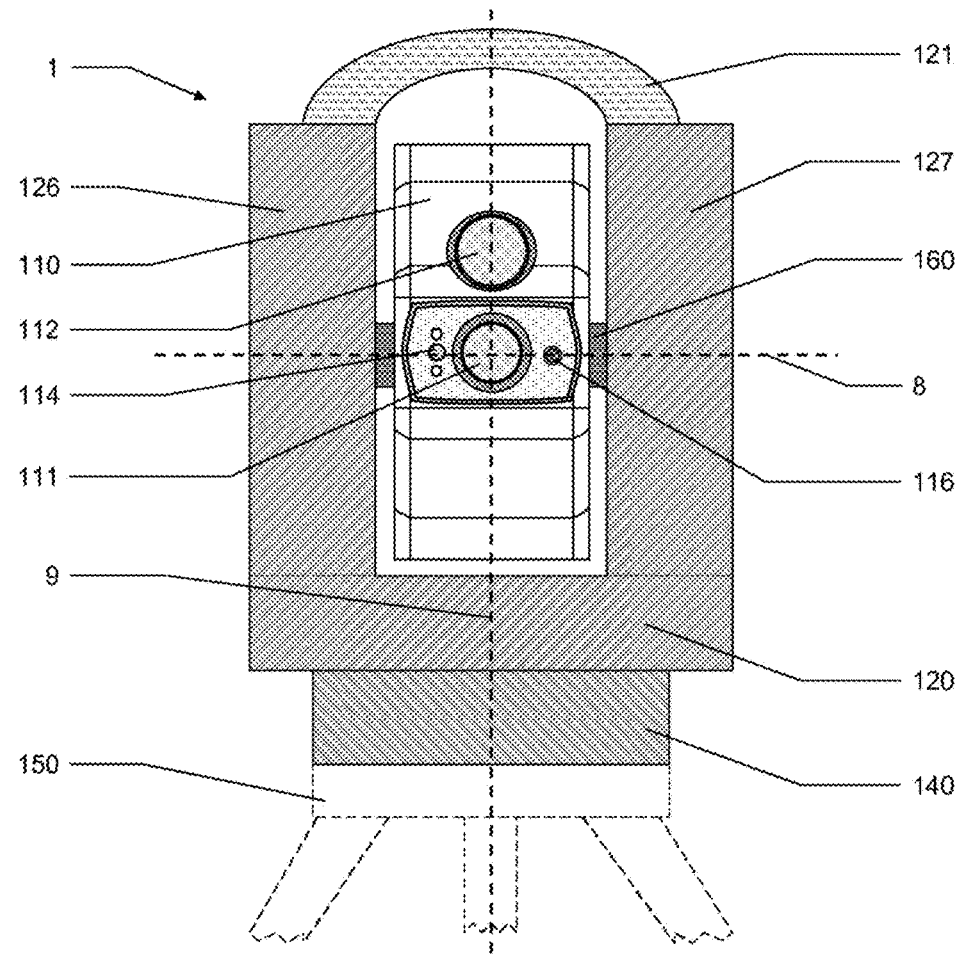
FIG. 2 shows a laser tracker according to the invention in a front view.

FIG. 2 shows one exemplary embodiment of a laser tracker 1 according to the invention in a frontal view. The laser tracker 1 comprises a base 140, which is fixable on a holding device, here illustrated in the form of a stand 150. A support 120 is fitted on the base 140 in a manner mounted rotatably about the vertical axis 9. The support 120 comprises a first strut 126 and a second strut 127, which project upward from the support 120 and on which a beam directing unit 110 is mounted tiltably about the horizontal axis 8 by means of a shaft 160. A handle 121 for the transport and handling of the laser tracker 1 is fitted to the two struts 126, 127. The handle 121 can be fixedly connected to the struts 126, 127, for example produced from a molding therewith or welded thereto, such that it serves as an additionally stabilizing element for the struts 126, 127, in particular with regard to bending.

In this exemplary embodiment, a plurality of optical units are provided on the beam directing unit 110, in particular an optical unit 112 of a measuring camera and also a laser emitting and receiving optical unit 111 of an optical distance measuring device. Furthermore, the beam directing unit 110 preferably has an optical unit of a localization camera 114 for coarsely localizing the measuring aid 80 and an optical unit of an overview camera 116 for providing images for a user.

Figure 3A:
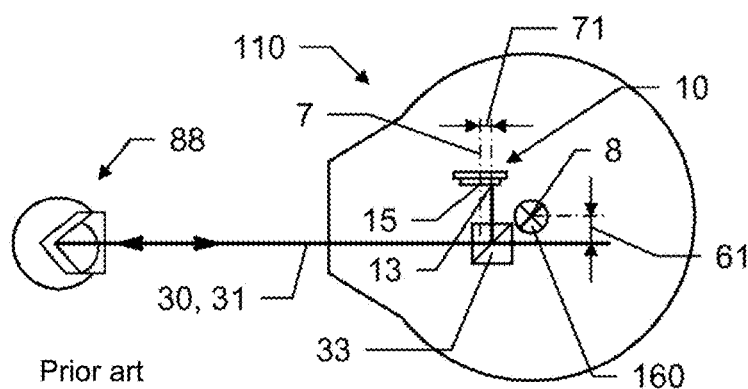
FIGS. 3a-b show a use of a large individual retroreflector as a calibration device for determining a beam offset of the returning laser beam impinging on the PSD.
Figure 3B:
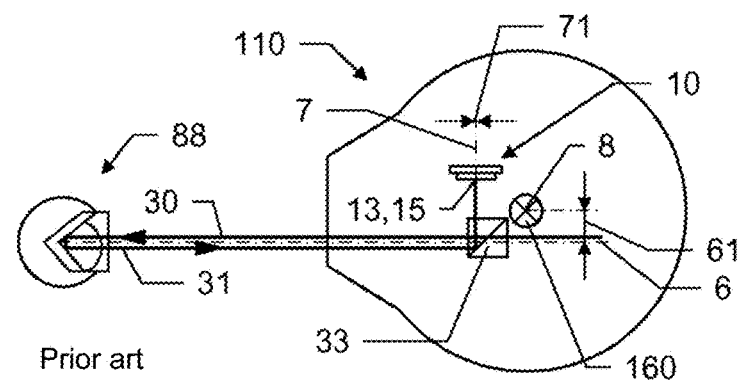

FIGS. 3a and 3b illustrate the use of a calibration device in the form of a large individual reflector 88, such as a prism or a corner cube, for example, for determining a beam offset 61 of the returning laser beam 31, impinging on the position-sensitive detector (PSD) 10, relative to the detector center 15, and also the disadvantages that arise in the case of this use.

In accordance with the alignment of the emitted measurement radiation 30 according to FIG. 3a, said radiation passes exactly through the center of the beam splitter 33 and also impinges exactly in the center of the individual retroreflector 88 in such a way that it is reflected on itself as returning laser beam 31 and is deflected by the beam splitter 33 onto the PSD 10 having a detector center 15.

On the PSD 10, the laser beam 31 impinges at a point 13 that is generally different than the detector center 15. If the direction and positioning of the emitted laser beam 30 on the retroreflector are adjusted, this impingement point is identical to a so-called servocontrol point, the accurate determination of which is essential for further measures and measurements for the self-calibration of the laser tracker. The servocontrol point determined in such a way generally has an offset 71 with respect to the detector center 15.

FIG. 3a furthermore indicates a telescope rotation axis 8, about which the beam directing unit 110 is rotatable, a beam offset 61 between a central axis through the rotation axis 8 and the returning laser beam 31 and the axes 6 and 7. In accordance with the situation according to FIG. 3a, the offset 71 and the beam offset 61 can be determined separately from one another.

FIG. 3b illustrates a situation according to which the emitted laser beam 30 does not impinge centrally on the individual reflector 88, but the distance 71 on the PSD 10 and the beam offset 61 of the target axis are known in a jointly correlated manner. In accordance with this situation, the emitted laser beam 30 does not impinge centrally on the center of the individual retroreflector 88, but rather on a first lateral reflection surface, and is deflected around the center of said retroreflector onto an opposite second reflection surface, from where it is reflected as returning laser beam 31 with a parallel offset with respect to the emitted laser beam 30. In the special case illustrated, the laser beam then impinges on the PSD 10 with a value zero of the offset 71 with respect to the detector center 15.

The offset 71 ("PSDOffset") and the beam offset 61 ("ZAAbst") can be determined by a total offset ("Offset") containing both individual parameters on the PSD 10 and can then be separated from one another by means of a simple equation system:

$$Direction_{corrected} = \arctan\left(\frac{PSDOffset - ZAAbst}{2 \times Dist}\right) - Direction \quad (1)$$

$$PSDOffset - ZAAbst = Offset' \quad (2)$$

As long as PSD offset (offset 71) and target axis distance (beam offset 61) are small enough, in this case the beam overlap between outgoing and returning beam remains good enough for reliable measurements in the case of use of laser interferometers (IFM) and absolute distance measuring devices (ADM). For an accurate calibration, however, such a case in which no offset occurs is preferred.

Figure 4:
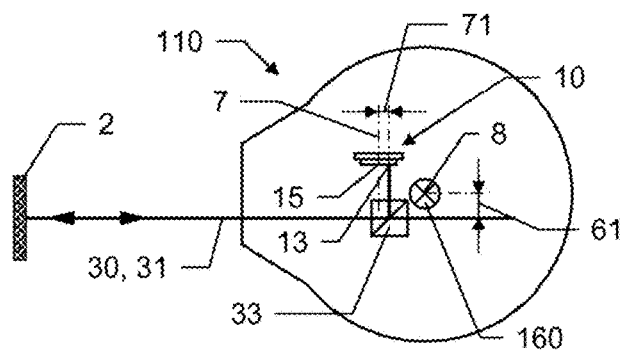
FIG. 4 shows a use of a retroreflector according to the invention as a calibration device for determining a beam offset of the returning laser beam impinging on the PSD.

In FIG. 4, the large individual retroreflector 88 shown in FIGS. 3a-b is replaced by a retroreflector 2 according to the invention. This retroreflector consists of a multiplicity of individual reflectors and thus, in contrast to the individual retroreflector 88, in a two-dimensional region, is designed for generating a substantially offset-free, coaxial retroreflection of measurement radiation 30 impinging on it, without in the process generating a significant offset of the reflected measurement radiation 31 with respect to the direction of the impinging measurement radiation 30.

Retroreflectors consisting of a multiplicity of individual reflectors are obtainable in a manner produced in different shapes and from different materials, for example as retroreflectors composed of hard plastic, such as are used for example for in road traffic, or as embossed plastic films. Such retroreflectors that are typically fabricated in mass production and consist of a multiplicity of individual reflectors often have defects or imperfections at their reflective surfaces.

FIGS. 5a-d illustrate the fundamental advantage of a retroreflector 2 which, in a two-dimensional region, is designed for generating a substantially offset-free, coaxial retroreflection with measurement radiation 30 impinging on it, in comparison with a conventional individual retroreflector 88 embodied as a "corner cube".

Figure 5A:
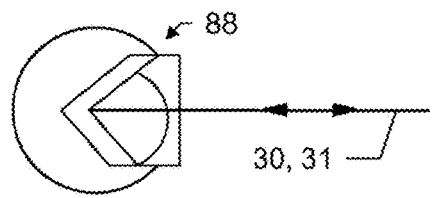
FIGS. 5a-d show differences in the use of the calibration devices shown in FIGS. 3a-b and 4.

In FIG. 5a, measurement radiation 30 impinges centrally on the individual retroreflector 88 and is reflected by the latter in a substantially offset-free manner as reflected measurement radiation 31.

Figure 5B:
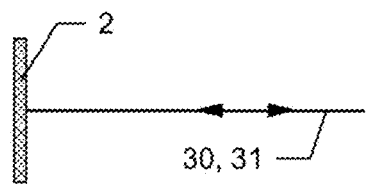

In FIG. 5b, measurement radiation 30 impinges centrally on a reflector 2 consisting of a multiplicity of individual reflectors and is reflected by the latter in a substantially offset-free manner as reflected measurement radiation 31.

Figure 5C:
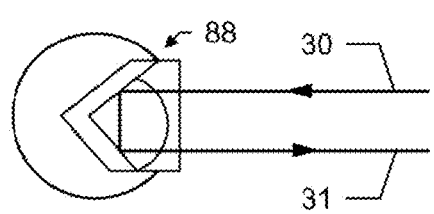

In FIG. 5c, measurement radiation 30 does not impinge centrally on the individual retroreflector 88 and is reflected by the latter as reflected measurement radiation 31 with an offset with respect to the incident measurement radiation 30.

Figure 5D:
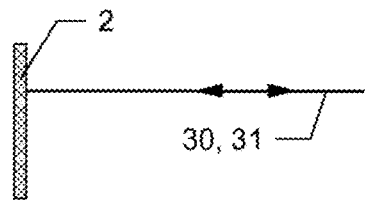

In FIG. 5d, measurement radiation 30 does not impinge centrally on a reflector 2 consisting of a multiplicity of individual reflectors—as illustrated in FIG. 5c for the individual retroreflector 88. In this case, the measurement radiation 30, in contrast to FIG. 5c, is reflected substantially in an offset-free manner as reflected measurement radiation 31.

Figure 6A:
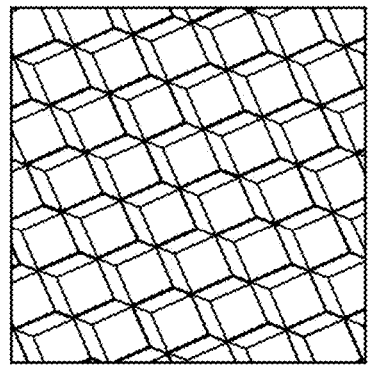
FIGS. 6a-c show microscope micrographs of different structures of retroreflectors consisting of many individual reflectors.
Figure 6B:
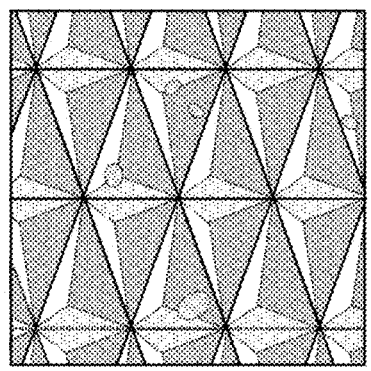
Figure 6C:
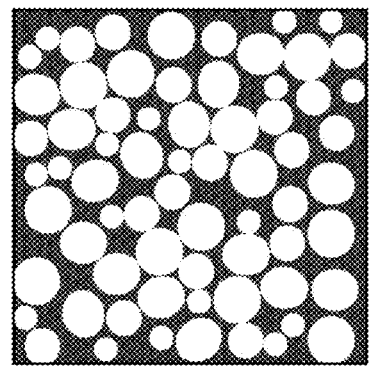

FIG. 6a shows a microscope micrograph of a retroreflector such as is used for a bicycle, for example. It consists of many small prisms of good quality, which are relatively large, however. Moreover, abutment joints of zones tilted with respect to one another are not illustrated here, but often occur in known retroreflectors of this type. The tilted zones are provided for bringing about a larger detectable angle of incidence for the reflection. FIG. 6b shows a microscope micrograph of a film with embossed prisms. In comparison with the prisms in accordance with FIG. 6a, the individual prisms are very much smaller. In terms of their shape, however, they are rarely perfect, but rather have clearly discernible defects. FIG. 6c shows a microscope micrograph of a film with glass beads. The individual glass beads vary greatly in their size and have in some instances relatively large distances between one another. As a consequence, reflections from such a film are generally relatively weak in intensity.

Reductions of the reflection properties of such retroreflectors which consist of a multiplicity of individual reflectors and are typically fabricated in mass production, in comparison with the reflection properties of significantly complexly producible individual retroreflectors such as individual prisms or "corner cubes", can be summarized as follows:

On account of the abovementioned imperfections of the retroreflectors consisting of many individual reflectors, in particular also deviations of the configuration of the individual reflectors from an envisaged ideal shape, in comparison with large-area individual retroreflectors having almost perfect optical surfaces, relatively little of the incident light is reflected or the incident light is reflected divergently. Such an effect may be entirely desirable for typical mass-produced applications, for example on high visibility jackets or road fixing posts, but is typically rather disadvantageous for use with a laser tracker. Moreover, the intensities of the reflected partial beams can vary greatly. In extreme cases, some individual reflectors even no longer reflect light back. Scratches or contaminants on the individual reflectors can also have similar disadvantageous effects.

A first further development of the present invention is illustrated with reference to FIG. 7a. A retroreflector 2 consisting of many individual reflectors, in particular a retroreflective film embodied in circular fashion, is mounted on a plate 50 and together therewith on a rotation spindle 51 that is rotatably drivable by a motor 55. By means of sequential measurement and averaging of the data from the sequential measurements, an effect of a granulation or interference pattern of the light 31 reflected back onto the PSD on the determination of the intensity centroid of the light 31 reflected back can already be eliminated after a few measurements. Disadvantageous effects of individual reflectors that are weakly reflective or not reflective at all can also be eliminated as a result.

In accordance with the illustration in FIG. 7a, according to the invention, moreover, the retroreflector 2 is not arranged perpendicularly, but rather at an angle of its reflective surface that deviates from 90° with respect to the spindle 51. As a result of a wobble movement of the retroreflector 2 that ensues upon rotation of the spindle 51 with retroreflector 2 and plate 50, this then has the effect of changing sequentially the targeting angles and thus the distances with respect to the retroreflector 2 or path lengths of light 30 incident on the back-reflector 2, permanently. In this case, the distance changes ideally amount to a plurality of wavelengths of the incident light 30. As a result, in the case of sequential measurements, corresponding sequential shifts of an interference pattern of the returning light 31 directed onto the PSD 10 are generated, such that effects of the interferences can be eliminated by the averaging of the measurement results. In FIG. 7a, the wobble movement is illustrated by the superimposition of different positions of retroreflector 2 and plate 50 indicated with solid and with broken lines.

Moreover, as likewise illustrated in FIG. 7a, by generating an oblique direction—i.e. a direction different than 90°—of the light 30 incident on the retroreflector 2, it is likewise possible to eliminate disadvantageous effects as a result of at its front surface rather than at the optical surfaces provided for reflection.

FIG. 7b illustrates an additional further development with respect to the embodiment of the invention in accordance with FIG. 7a. This further development is in particular also suitable for an arrangement of the plate 50 with—situated thereon—a geometrically suitably embodied retroreflector or retroreflective film in a beam directing unit.

FIG. 7b illustrates a plate 50 with a design or surface segmented for varying light transmission. The plate 50 is arranged in a pivotable and/or rotatable manner around a spindle 51. An, in this case, semicirculate region of the plate is equipped with a retroreflector 2, in particular a retroreflective film. A further region 53 is provided for a dark calibration, i.e. for measurements for determining a baseline of detector signals, without light 31 reflected back onto the PSD. In this case, this region can have for example a light absorbing and in particular also in reflection diffusely scattering dark surface, in particular composed of felt or velvet. A further region 42 is embodied for transparency to light, i.e. for regular measurements with the laser tracker for example as a simple opening.

This further development of the invention is associated with various advantages. In particular, the emitted laser beam 30 does not have to be oriented differently for the purpose of measurements for determining the servocontrol point and the distance thereof with respect to the center of the PSD for the self-calibration of the alignment and targeting of an object, in particular to be tracked, arranged outside the laser tracker.

In this case, there are various embodiment possibilities for determining the servocontrol point: in accordance with a first embodiment possibility, the plate 50 in the region of the retroreflector 2 oscillates back and forth between two positions in the emission direction of the laser beam 30, wherein sequential measurements are carried out continuously, such that disadvantageous effects of imperfections of the retroreflector 2 are eliminatable by averaging the sequential measurement results. In accordance with another embodiment possibility, the plate 50 with its embodied regions 2, 53 and 52 rotates continuously in one direction, wherein the intensity of light reflected back onto the PSD is continuously measured and measured as a function of the rotational position of the plate 50, recorded as a measurement record and evaluated.

An exemplary profile of intensities—implemented with the embodiment of the invention according to FIG. 7b and determined by the PSD—of light impinging on this detector, as a function of the rotational position of the plate 50, upon a rotation of the plate 50 in the counterclockwise direction, is illustrated in FIG. 8, which should be understood in association with the embodiment of the plate 50 in accordance with FIG. 7b.

The exemplary measurement values of the PSD show, for a plate position between 0° and 90°, i.e. a representation range 91, a light intensity value, in arbitrary units, of near or just above zero. Values of just above zero are generated by residual reflections from the substantially, but in practice not fully, absorbent region 53 of the plate 50. The represented angle range 92 of between just above 90° and near 180° corresponds to the position of the plate 50 in which it is transparent to emitted light in its region 52 illustrated in FIG. 7b for so-called regular measurements of the laser tracker, with the targeting of an object to be tracked, if appropriate. Consequently, no reflected light passes onto the PSD, and its intensity signal has the value zero.

The exemplary measurement values of the PSD are of particular relevance for the purposes of self-calibration for the angle ranges 93, 94 and 93'. For the angle ranges 93 of between just below 180° and just above 180° and 93' of between just below and just above 360°, in each case a situation is present in which the incident laser beam 30 only partly impinges on the region of the retroreflector 2 and is reflected from there. Preferably, suitable analysis software or a suitable analysis algorithm is used to establish, for the ranges 93, 93' which in this illustration are adjacent to an intermediate range 94 centered substantially around 360°, a threshold value of an ascertained lower intensity value for a determination of an average value of the for a determination of the intensity values ascertained for the range 94 for the purpose of determining the intensity centroid of from the region 2 of intensities of light beams which are reflected by the retroreflector 2.

Such a threshold value can advantageously also be used to filter out values of measurements at defective or contaminated locations of a retroreflector. In principle, the use of such a threshold value for eliminating values of such incorrect measurements is also usable for the above-described method of an oscillating plate. By way of example, FIG. 8 indicates in the range 94 a comparatively low intensity measurement value 95 that is attributable to such a defective location on the retroreflector.

As an equivalent for sequential measurements on different points of a plate that rotates or oscillates with a retroreflector for the purpose of averaging sequentially determined measurement values and/or eliminating the values of measurements carried out on defective locations of the retroreflector by means of a threshold value, in particular for configurations in which the retroreflector is arranged outside the beam directing unit, in accordance with a further advantageous embodiment, the beam directing unit, in particular in a motor-driven fashion, is moved about the tilting and/or rotation axis in order to traverse a path of predefined geometry with the emitted laser beam 30 on the retroreflector.

Figure 9A:
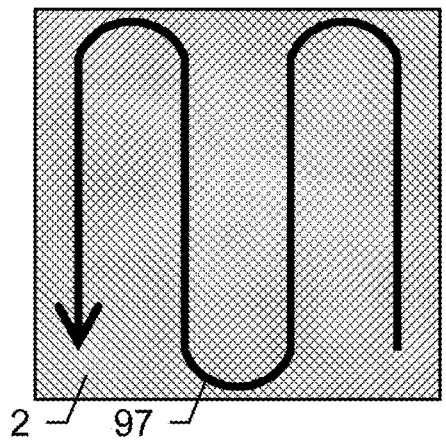
FIGS. 9a-b show by way of example for a different embodiment of the invention, in which the retroreflector consisting of many individual reflectors is arranged on a stationary part of the laser tracker, two-dimensional paths in the form of a meandering path and a circular path.
Figure 9B:
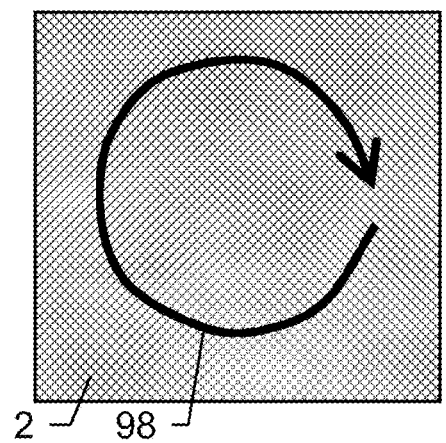
Figure 9C:
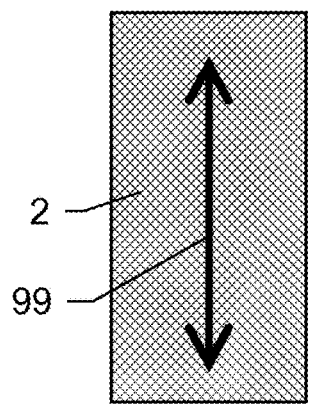
FIG. 9c shows a one-directional path by way of example for a configuration in which the retroreflector consisting of many individual reflectors is arranged on a rotatable part of the laser.

FIGS. 9a and 9b illustrate two-dimensional paths in the form of a meandering path 97 and a circular path 98 by way of example for a configuration in which the retroreflector consisting of many individual reflectors is arranged on the stationary part. FIG. 9c illustrates a one-dimensional path, which is advantageously traversed multiply, in the form of a straight strip 99, by way of example for a configuration in which the retroreflector consisting of many individual reflectors is arranged on the rotatable part.

It goes without saying that these illustrated figures merely schematically illustrate possible exemplary embodiments. The different approaches can likewise be combined with one another and also with methods and devices from the prior art.

What is claimed is:

1. A laser tracker for determining the position of a target, the laser tracker comprising:
    a beam source for generating measurement radiation,
    a base defining a vertical axis,
    a support defining a tilting axis, which is orthogonal to the vertical axis, wherein the support is pivotable in a motorized fashion about the vertical axis relative to the base and a horizontal pivoting angle is defined by an orientation of the support relative to the base,
    a beam directing unit, which is pivotable in a motorized fashion about the tilting axis relative to the support, wherein a vertical pivoting angle is defined by an orientation of the beam directing unit relative to the support, for emission and orientation of the measurement radiation and for reception of at least part of the measurement radiation reflected at the target,
    angle measuring functionality for determining the horizontal pivoting angle and the vertical pivoting angle,
    distance measuring functionality, and
    a position-sensitive surface detector, for determining an impingement point of the reflected measurement radiation on the surface detector and for generating an output signal for controlling a target tracking functionality,
    wherein the laser tracker, for determining calibration parameters with regard to a position and/or direction of the measurement radiation additionally comprises a retroreflective calibration device for use with a self-calibration functionality, in the context of which an impingement point of the measurement radiation reflected by the calibration device on the position-sensitive surface detector is determinable, wherein:

the calibration device has a retroreflector, which retroreflector, in a two-dimensional region, independently of the impingement point of the measurement radiation within the two-dimensional region, is designed for generating an offset-free, coaxial retroreflection of measurement radiation impinging on it.

2. The laser tracker as claimed in claim 1, wherein:
the determinable calibration parameters comprise a servocontrol point.

3. The laser tracker as claimed in claim 1, wherein:
in the context of the self-calibration functionality with the measurement radiation a path on the retroreflector is traversable, such that measurement radiation reflected in each case at a multiplicity of different points of the two-dimensional region is generatable, and
the laser tracker is designed to ascertain an average value in the context of the self-calibration functionality for a multiplicity of measurement data generated by the measurement radiation reflected at the multiplicity of different points.

4. The laser tracker as claimed in claim 1, wherein:
the retroreflector has a multiplicity of individual reflectors.

5. The laser tracker as claimed in claim 4, wherein:
the retroreflector is embodied as a retroreflective film or a rigid microprism array.

6. The laser tracker as claimed in claim 4, wherein:
the individual reflectors comprise reflective spheres or prisms.

7. The laser tracker as claimed in claim 1, wherein:
the retroreflector comprises either or both plastic and glass.

8. The laser tracker as claimed in claim 1, wherein:
the retroreflector is arranged on the base or on the support, and
the beam directing unit is designed to traverse with the measurement radiation a circular or meandering or linear path on the retroreflector.

9. The laser tracker as claimed in claim 1, wherein:
the retroreflector is integrated into the base or into the support or fixedly connected to the base or the support.

10. The laser tracker as claimed in claim 1, wherein:
the retroreflector is arranged in the beam directing unit or between the beam source and the beam directing unit in combination with a device for light shading in a beam path to the position-sensitive surface detector.

11. The laser tracker as claimed in claim 1, wherein:
the retroreflector is arranged in the beam directing unit or between the beam source and the beam directing unit in a manner movable into a beam path of the measurement radiation.

12. The laser tracker as claimed in claim 1, wherein:
the retroreflector is arranged in a plane situated non-orthogonally with respect to the direction of the measurement radiation.

13. The laser tracker as claimed in claim 1, wherein:
the retroreflector is movable in the context of the self-calibration functionality into a plane situated non-orthogonally with respect to the direction of the measurement radiation.

14. The laser tracker as claimed in claim 1, wherein:
the retroreflector is embodied as a part of a plate, which is pivotable or rotatable about a rotation spindle, such that measurement radiation reflected in each case at a multiplicity of individual reflectors of the retroreflector is generatable, wherein the plate is arranged in a manner rotatable between two predefined rotation angles or in a manner rotatable continuously in at least one rotation direction.

15. The laser tracker as claimed in claim 14, wherein:
the plate is embodied with:
a first surface portion formed by the retroreflector,
a second surface portion, which is substantially non-transmissive to the measurement radiation and has a light absorbing and/or in reflection diffusely scattering dark surface, and
a third surface portion which is substantially transmissive to the measurement radiation.

16. The laser tracker as claimed in claim 14, wherein:
the retroreflector is arranged non-perpendicularly to the rotation spindle, such that a wobble movement of the retroreflector is implementable upon a rotation of the retroreflector about the rotation spindle.

17. The laser tracker as claimed in claim 1, wherein:
a first camera for capturing the spatial orientation of the target, and
a second camera for coarsely localizing the target.

18. The laser tracker as claimed in claim 1, wherein:
the measurement radiation is a laser beam, and the laser tracker comprises an absolute distance measuring device and/or an interferometer.

19. The laser tracker as claimed in claim 1, wherein:
the two-dimensional region of the retroreflector is larger than a beam diameter of the impinging measurement radiation.

20. The laser tracker as claimed in claim 1, wherein:
the two-dimensional region is large enough to be impinged on by the measurement radiation if:
a midpoint of the two-dimensional region is targeted with the measurement radiation, and
the measurement radiation strays within expectable bounds.

21. A self-calibration method for a laser tracker, the method comprising:
emitting measurement radiation onto a calibration device,
generating a retroreflection of measurement radiation impinging on the calibration device as reflected measurement radiation,
determining an impingement point of the measurement radiation reflected by the calibration device on a position-sensitive surface detector, and
determining calibration parameters with regard to a position and/or direction of the measurement radiation, wherein:
the calibration device has a retroreflector integrated into the laser tracker or fixed to the laser tracker, wherein
the measurement radiation is emitted onto a two-dimensional region of the retroreflector, and
independently of the impingement point of the measurement radiation within the two-dimensional region, an offset-free, coaxial retroreflection of the measurement radiation is generated as reflected measurement radiation.

22. The self-calibration method as claimed in claim 21, further comprising:

generating reflected measurement radiation at a multiplicity of different points of the two-dimensional region, and ascertaining an average value for a multiplicity of measurement data generated by the measurement radiation reflected at the multiplicity of different points.

23. The self-calibration method as claimed in claim 22, further comprising:

traversing a circular, meandering or linear path on the retroreflector with the measurement radiation by moving the retroreflector and a part of the laser tracker which emits or forwards the measurement radiation relative to one another.

24. The self-calibration method as claimed in claim 21, further comprising:

pivoting or rotating the retroreflector into a beam path of the measurement radiation, wherein the retroreflector is arranged non-perpendicularly to a pivoting or rotation spindle, such that the pivoting or rotation implements a wobble movement of the retroreflector.

* * * * *